United States Patent
Narita et al.

(10) Patent No.: US 11,185,925 B2
(45) Date of Patent: Nov. 30, 2021

(54) PROCESS ABNORMALITY DETECTION SYSTEM FOR THREE-DIMENSIONAL ADDITIVE MANUFACTURING DEVICE, THREE-DIMENSIONAL ADDITIVE MANUFACTURING DEVICE, PROCESS ABNORMALITY DETECTION METHOD FOR THREE-DIMENSIONAL ADDITIVE MANUFACTURING DEVICE, METHOD FOR MANUFACTURING THREE-DIMENSIONAL ADDITIVE MANUFACTURED PRODUCT, AND THREE-DIMENSIONAL ADDITIVE MANUFACTURED PRODUCT

(71) Applicant: MITSUBISHI HEAVY INDUSTRIES, LTD., Tokyo (JP)

(72) Inventors: Ryuichi Narita, Tokyo (JP); Toshiya Watanabe, Tokyo (JP); Akio Kondou, Tokyo (JP); Masashi Kitamura, Tokyo (JP); Hidetaka Haraguchi, Tokyo (JP); Shuji Tanigawa, Tokyo (JP); Claus Thomy, Bremen (DE); Henry Koehler, Bremen (DE); Michael Kalms, Bremen (DE)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/615,530

(22) PCT Filed: Aug. 8, 2017

(86) PCT No.: PCT/JP2017/028843
§ 371 (c)(1),
(2) Date: Nov. 21, 2019

(87) PCT Pub. No.: WO2019/030837
PCT Pub. Date: Feb. 14, 2019

(65) Prior Publication Data
US 2020/0180023 A1 Jun. 11, 2020

(51) Int. Cl.
*B22F 10/00* (2021.01)
*B22F 10/20* (2021.01)
(Continued)

(52) U.S. Cl.
CPC .............. *B22F 10/20* (2021.01); *B33Y 10/00* (2014.12); *B33Y 30/00* (2014.12); *B33Y 50/02* (2014.12); *G01B 11/2545* (2013.01); *B22F 10/30* (2021.01)

(58) Field of Classification Search
CPC ................ B22F 2999/00; B22F 3/1055; B22F 2003/1057; B22F 2003/1056;
(Continued)

(56) References Cited

U.S. PATENT DOCUMENTS

| | | | |
|---|---|---|---|
| 2016/0199911 A1 | 7/2016 | Dave et al. | |
| 2017/0144248 A1 | 5/2017 | Yoshimura et al. | |
| 2017/0239719 A1* | 8/2017 | Buller | B22F 3/1055 |

FOREIGN PATENT DOCUMENTS

| | | |
|---|---|---|
| CN | 106163774 | 11/2016 |
| CN | 106846335 | 6/2017 |

(Continued)

OTHER PUBLICATIONS

Bin Zhang et al. "In situ surface topography of laser powder bed fusion using fringe projection" Aug. 16, 2016, Additive Manufacturing12 (2016) 100-107.*

(Continued)

*Primary Examiner* — Michael P Stafira
(74) *Attorney, Agent, or Firm* — Wenderoth, Lind & Ponack, L.L.P.

(57) ABSTRACT

A process abnormality detection system for a three-dimensional additive manufacturing device which performs additive modeling by emitting a beam to a powder bed determines that a laying abnormality of the powder bed is (Continued)

occurring if at least one of a first condition that an average height of the powder bed from a reference position is out of a first predetermined range or a second condition that a height variation of the powder bed is out of a second predetermined range is satisfied, on the basis of a detection result of a shape measurement sensor.

10 Claims, 4 Drawing Sheets

(51) Int. Cl.
  *B33Y 10/00* (2015.01)
  *B33Y 30/00* (2015.01)
  *B33Y 50/02* (2015.01)
  *G01B 11/25* (2006.01)
  *B22F 10/30* (2021.01)

(58) Field of Classification Search
  CPC .... B22F 2207/17; B22F 3/11; B22F 2203/11; B22F 2203/03; B22F 5/00; B22F 2203/00; B22F 2003/1058; B22F 2998/10; B22F 7/002; B22F 2202/11; B22F 3/008; B22F 9/30; B22F 1/0018; B22F 3/1017; B22F 2003/1059; B22F 2003/247; B22F 2202/01; B22F 2301/052; B22F 3/02; B22F 3/15; B22F 7/06; B22F 5/04; B22F 5/10; B22F 7/02; B22F 10/20; B22F 10/00; B22F 10/28; B22F 5/06; B22F 7/062; B22F 7/08; B22F 3/1103; B22F 10/10; B22F 5/007; B22F 10/38; B22F 10/50; B22F 12/17; B22F 12/45; B22F 10/14; B22F 10/30; B22F 10/64; B22F 12/30; B22F 12/90; B22F 10/31; B22F 10/366; B22F 10/40; B22F 10/70; B22F 10/85; B22F 12/38; B22F 12/40; B22F 2003/248; B22F 3/1115; B22F 3/24; B22F 5/009; B22F 10/68; B22F 12/00; B22F 1/0011; B22F 2003/242; B22F 2003/244; B22F 2202/15; B22F 2202/17; B22F 2207/01; B22F 2302/45; B22F 2304/10; B22F 3/1112; B22F 7/004; B22F 9/082; B22F 10/18; B22F 10/37; B22F 10/43; B22F 10/47; B22F 10/66; B22F 10/73; B22F 12/41; B22F 12/67; B22F 12/70; B22F 1/0003; B22F 1/0059; B22F 1/0074; B22F 2005/001; B22F 2005/004; B22F 2202/13; B22F 2301/15; B22F 2301/35; B22F 2301/355; B22F 2302/10; B22F 2302/105; B22F 2302/20; B22F 2302/403; B22F 3/105; B22F 3/1109; B22F 3/225; B22F 3/26; B22F 7/008; B22F 9/14; B33Y 10/00; B33Y 50/02; B33Y 30/00; B33Y 40/00; B33Y 80/00; B33Y 50/00; B33Y 70/00; B33Y 40/20; B33Y 70/10; B33Y 40/10; B33Y 99/00; G01N 21/8851; G01N 2291/267; G01N 29/043; G01N 29/2418; G01N 11/04; G01N 2021/1706; G01N 2021/4711; G01N 2021/4735; G01N 2021/479; G01N 2021/4792; G01N 2021/8411; G01N 2021/8416; G01N 21/1702; G01N 21/1717; G01N 21/45; G01N 21/4788; G01N 21/95; G01N 21/9515; G01N 2201/06113; G01N 2201/0634; G01N 2201/0638; G01N 2223/419; G01N 2223/646; G01N 2291/014; G01N 2291/0231; G01N 2291/0234; G01N 2291/0251; G01N 2291/0258; G01N 2291/028; G01N 2291/02827; G01N 2291/0289; G01N 2291/102; G01N 2291/2698; G01N 23/22; G01N 23/2206; G01N 23/2208; G01N 23/2252; G01N 23/2273; G01N 23/2276; G01N 25/72; G01N 27/72; G01N 27/83; G01N 27/9013; G01N 27/902; G01N 27/9046; G01N 29/045; G01N 29/07; G01N 29/12; G01N 29/348; G01N 29/4436; G01N 29/4472; G01N 35/1011; G01N 9/32; G02B 15/142; G02B 2006/0098; G02B 26/0816; G02B 26/101; G02B 27/09; G02B 27/108; G02B 6/02052; G02B 6/3504; G02B 6/4249; G02B 7/04; G01B 21/16
  See application file for complete search history.

(56) References Cited

FOREIGN PATENT DOCUMENTS

| | | | | |
|---|---|---|---|---|
| CN | 106925785 | | 7/2017 | |
| CN | 108883575 | | 11/2018 | |
| EP | 2942130 | A1 * | 11/2015 | ........... G01B 11/002 |
| JP | 11-347761 | | 12/1999 | |
| JP | 2009-1900 | | 1/2009 | |
| JP | 2015-196265 | | 11/2015 | |
| JP | 2016-097657 | | 5/2016 | |
| WO | WO-2015040433 | A2 * | 3/2015 | ............. B22F 10/20 |
| WO | 2016/081651 | | 5/2016 | |
| WO | 2016/198885 | | 12/2016 | |

OTHER PUBLICATIONS

International Search Report dated Oct. 3, 2017 in International (PCT) Patent Application No. PCT/JP2017/028843.
International Preliminary Report on Patentability dated Feb. 20, 2020 in International (PCT) Patent Application No. PCT/JP2017/028843.
Office Action dated Jun. 3, 2021 in corresponding Chinese Patent Application No. 201780090787.7.

* cited by examiner

PROCESS ABNORMALITY DETECTION SYSTEM FOR THREE-DIMENSIONAL ADDITIVE MANUFACTURING DEVICE, THREE-DIMENSIONAL ADDITIVE MANUFACTURING DEVICE, PROCESS ABNORMALITY DETECTION METHOD FOR THREE-DIMENSIONAL ADDITIVE MANUFACTURING DEVICE, METHOD FOR MANUFACTURING THREE-DIMENSIONAL ADDITIVE MANUFACTURED PRODUCT, AND THREE-DIMENSIONAL ADDITIVE MANUFACTURED PRODUCT

TECHNICAL FIELD

This disclosure relates to a process abnormality detection system for a three-dimensional additive manufacturing device which performs additive modeling by emitting a beam such as a light beam or an electron beam to laid powder and selectively hardening the powder, the three-dimensional additive manufacturing device equipped with the above-mentioned system, a process abnormality detection method for the three-dimensional additive manufacturing device, a method for manufacturing a three-dimensional additive manufactured product by using the above-mentioned process abnormality detection method, and the three-dimensional additive manufactured product manufactured by the above-mentioned manufacturing method.

BACKGROUND

A 3D printing technology which performs additive modeling of a 3D-shaped object by emitting a beam such as a light beam or an electron beam to powder laid in a layered state is known. For example, Patent Document 1 discloses a 3D printing method for manufacturing a 3D-shaped object in which a plurality of sintered layers are integrally laminated by forming the sintered layers by emitting the light beam to a powder layer which is formed of the powder, and then repeating this sintered layer forming process.

CITATION LIST

Patent Literature

Patent Document 1: JP2009-1900A

SUMMARY

Technical Problem

The 3D printing method as in the above-mentioned Patent Document 1 is designed to form a large 3D-shaped object by repeatedly laminating the sintered layers in a layered state, so that under the present circumstances, it requires long working hours until its completion. Particularly when metal powder such as iron, copper, aluminum, or titanium is used, the work hours will be several tens of hours.

Meanwhile, regarding this type of the 3D printing method, it is necessary to lay the powder uniformly before emitting the beam; however, if the laid surface has protrusions and recesses, it may possibly lead to inferior quality of a formed object. Furthermore, since the beam emission process after laying the powder is thermal processing, there is a possibility that a significant deformation may occur in the middle of the forming process. For example, if the deformation occurs to protrude upwards from the powder-laid surface, the laid surface may easily form protrusions and recesses when the powder is laid in the next cycle. Also, if spatters produced from part of the melted powder in the middle of the forming process remain, such spatters become foreign matters, which result in a fear that such foreign matters may lead to incomplete fusion causing the occurrence of cracks and the inferior quality such as an increase in an oxygen concentration of an formed article.

Abnormalities which may lead to the inferior quality sometimes occur in the middle of the forming process as described above; however, under the present circumstances, the occurrence of such abnormalities may have to depend exclusively on visual checking. Since the forming work requires long hours as described above, it is not realistic to visually check the entire process and, therefore, there is a demand for the development of a new technology. Conventionally, a judgment of acceptance on the inferior quality is performed after the completion of a sequence of the forming process by conducting a nondestructive test of the completed formed article. However, regarding such a method, if any abnormality is discovered by the test after the completion of the forming process, that formed article has to be disposed of as a defective product and the long work hours spent until then will turn into a waste of time. This is one of major factors which will cause reworking and a wasteful increase in man-hours and interrupt the improvement of productivity.

At least one embodiment of the present invention was devised in light of the above-described circumstances and it is an object of the invention to provide a process abnormality detection system for a three-dimensional additive manufacturing device capable of detecting various kinds of abnormalities, which may occur in the middle of the forming process, in an early stage and accurately, the three-dimensional additive manufacturing device equipped with the above-described system, and a process abnormality detection method for the three-dimensional additive manufacturing device. Furthermore, it is an object of the invention to provide a method for manufacturing a three-dimensional additive manufactured product having good quality by using the above-described process abnormality detection method and the three-dimensional additive manufactured product manufactured by the above-described manufacturing method.

Solution to Problem (1) In order to solve the above-described problem, a process abnormality detection system for a three-dimensional additive manufacturing device according to at least one embodiment of the present invention is a process abnormality detection system for a three-dimensional additive manufacturing device which performs additive modeling by emitting a beam to a powder bed wherein the process abnormality detection system includes: a shape measurement sensor for measuring a surface shape of the powder bed; and a laying abnormality determination part configured to determine that a laying abnormality of the powder bed is occurring if at least one of a first condition that an average height of the powder bed from a reference position is out of a first predetermined range or a second condition that a height variation of the powder bed is out of a second predetermined range is satisfied, on the basis of a detection result of the shape measurement sensor.

According to the above-described configuration (1), when the measurement result of the surface shape of the powder bed by the shape measurement sensor satisfies at least one of the first condition and the second condition, it is determined that a laying abnormality is occurring. With this type of the additive molding process, it is necessary to lay the powder uniformly before emitting the beam; and if the laid surface has a laying abnormality such as protrusions and recesses, that may possibly lead to the inferior quality of the formed object; however, the laying abnormality can be detected accurately by the above-described determination based on the first condition and the second condition.

Under the first condition, the laying abnormality can be determined based on whether or not the average height of the powder bed from the reference position is out of the first predetermined range. Accordingly, the laying abnormality can be determined, for example: when the average height of the laid powder bed is too low, an beam output becomes excessive relative to an amount of the powder of the powder bed, which results in excessive melting; and on the other hand, when the average height of the laid powder bed is too high, the beam output becomes insufficient relative to the powder amount of the powder bed, which results in the shortage of melting. Furthermore, under the second condition, the laying abnormality can be determined based on whether or not the height variation of the powder bed is out of the second predetermined range. Consequently, any abnormality which may occur in the middle of the forming process and lead to the inferior quality can be detected in an early stage and accurately by determining the laying abnormality from the two viewpoints, that is, the first condition and the second condition.

(2) According to some embodiments in the above-described configuration (1), the process abnormality detection system further includes a forming abnormality determination part configured to determine that a forming abnormality of a forming layer from the powder bed is occurring if a third condition that a deformation amount of the powder bed due to emission of the beam is out of a third predetermined range is satisfied, on the basis of a measurement result of the powder bed by the shape measurement sensor after emission of the beam.

According to the above-described configuration (2), when the measurement result of the surface shape of the powder bed by the shape measurement sensor satisfies the third condition, it is determined that a forming abnormality is occurring. Under the third condition, the forming abnormality is determined based on whether or not the deformation amount of the powder bed due to emission of the beam is out of the third predetermined range. Since the beam emission process after laying the powder is thermal processing, there is a possibility that the forming abnormality which involves a significant deformation may occur in the middle of the forming process; however, such forming abnormality can be detected accurately by the determination based on the third condition.

(3) According to some embodiments in the above-described configuration (2), the forming abnormality determination part is configured to determine that the forming abnormality of the forming layer from the powder bed is occurring if a spatter exists locally on the forming layer on the basis of a measurement result of the powder bed by the shape measurement sensor after emission of the beam, whether or not the third condition is satisfied.

According to the above-described configuration (3), when the spatter exists locally on the forming layer after emission of the beam the beam, it is determined, regardless of whether the third condition is satisfied or not, that the forming abnormality is occurring. This is because the spatter(s) is formed by containing oxides at a relatively high rate when the powder is melted by the beam, so that if the spatter(s) exists locally, it may easily cause subsequent defective forming.

Incidentally, whether the spatter(s) exists locally or not according to this configuration may be determined based on, for example, whether or not a projected area (protrusion projected area) of a protruding deformation amount produced on the surface of the powder bed after the beam emission is equal to or less than an assumed spatter particle diameter. Under this circumstance, the spatter particle diameter which serves as the reference can be set corresponding to a spatter occurrence form; and, for example, in a case of spatters in the occurrence form where the spatters scatter from a molten pool formed by the emission of the beam to the powder bed and then solidify, the assumed spatter particle diameter is relatively large, that is, approximately 150 μm to 300 m, so that it can be determined that the spatter(s) exists locally when the protrusion projected area of 300 μm×300 μm or smaller is obtained.

(4) According to some embodiments in the above-described configuration (2) or (3), the process abnormality detection system further includes a forming-abnormality warning notice part configured to issue a warning for notifying the forming abnormality if the forming abnormality determination part determines that the forming abnormality is occurring.

According to the above-described configuration (4), when it is determined in the above-described configuration that the forming abnormality is occurring, it becomes possible to deal with the situation appropriately by discontinuing or suspending the forming work as a result of issuing the warning to that effect.

Incidentally, a warning behavior by the forming-abnormality warning notice part may prompt a behavior to deal with the situation in a manner perceivable by five senses of a human such as an operator or may give an instruction to the three-dimensional additive manufacturing device, which is implementing the forming work, to perform automatic control in an electrical or mechanical manner.

(5) According to some embodiments in any one of the above-described configurations (1) to (4), the shape measurement sensor includes: a projector for projecting a fringe pattern on a surface of the powder bed; at least one image-capturing unit for capturing an image of the fringe pattern; and an analyzing part for generating a 3D data representing the surface shape of the powder bed on the basis of the image of the fringe pattern captured by the image-capturing unit.

According to the above-described configuration (5), real-time measurement of the surface shape of the powder bed can be implemented in a noncontact manner at high speeds by adopting a fringe projection method as the shape measurement sensor.

(6) According to some embodiments in any one of the above-described configurations (1) to (5), the process abnormality detection system further includes a laying-abnormality warning notice part configured to issue a warning for notifying the laying abnormality if the laying abnormality determination part determines that the laying abnormality is occurring.

According to the above-described configuration (6), when it is determined in the above-described configuration that the laying abnormality is occurring, it becomes possible to deal with the situation appropriately by discontinuing or suspending the forming work as a result of issuing the warning to that effect.

Incidentally, a warning behavior by the laying-abnormality warning part may prompt a behavior to deal with the situation in a manner perceivable by five senses of a human such as the operator or may give an instruction to the three-dimensional additive manufacturing device, which is implementing the forming work, to perform automatic control in an electrical or mechanical manner.

(7) According to some embodiments in any one of the above-described configurations (1) to (6), the first predetermined range is determined by an expression $0.5M<\Delta t<2M$, where $\Delta t$ is a difference between the reference position and the average height of the powder head from the reference position, and M is a movement amount of a base plate per forming cycle.

According to the above-described configuration (7), the laying abnormality can be determined accurately by defining the first predetermined range, which is used to determine the first condition, by the above-mentioned expression based on the movement amount of the base place per cycle.

(8) According to some embodiments in any one of the above-described configurations (1) to (7), the second predetermined range is determined by an expression $3\sigma<M$, where $\sigma$ is the height variation of the powder bed, and M is a movement amount of a base plate per forming cycle.

According to the above-described configuration (8), the laying abnormality can be determined accurately by defining the second predetermined range, which is used to determine the second condition, by the above-mentioned expression based on the movement amount of the base place per cycle.

(9) According to some embodiments in the above-described configuration (2), the third predetermined range is determined by an expression $Cmax<M$, where $Cmax$ is a maximum deformation amount of the powder bed and M is a movement amount of a base plate per forming cycle.

According to the above-described configuration (9), the laying abnormality can be determined accurately by defining the third predetermined range, which is used to determine the third condition, by the above-mentioned expression based on the movement amount of the base place per cycle.

(10) In order to solve the above-mentioned problem, a process abnormality detection system for a three-dimensional additive manufacturing device according to at least one embodiment of the present invention is a process abnormality detection system for a three-dimensional additive manufacturing device which performs additive modeling by emitting a beam to a powder bed, wherein the process abnormality detection system includes: a shape measurement sensor for measuring a surface shape of the powder bed; and a forming abnormality determination part configured to determine that a forming abnormality of a forming layer from the powder bed is occurring if a third condition that a deformation amount of the powder bed due to emission of the beam is out of a third predetermined range is satisfied, on the basis of the measurement result of the powder bed by the shape measurement sensor after emission of the beam.

According to the above-described configuration (10), when the measurement result of the surface shape of the powder bed by the shape measurement sensor satisfies the third condition, it is determined that a forming abnormality is occurring. Under the third condition, the forming abnormality is determined based on whether or not the deformation amount of the powder bed due to emission of the beam is out of the third predetermined range. Since the beam emission process after laying the powder is thermal processing, there is a possibility that the forming abnormality which involves a significant deformation may occur in the middle of the forming process; however, such forming abnormality can be detected accurately by the determination based on the third condition.

(11) In order to solve the above-mentioned problem, a three-dimensional additive manufacturing device according to at least one embodiment of the present invention includes: a base plate; a powder laying unit for laying a powder on the base plate to form a powder bed; a beam emitting unit for emitting a beam to the powder bed to selectively harden the powder bed; and the process abnormality detection system according to any one of the above-described configurations (1) to (10), which is configured to detect the laying abnormality of the power bed at least by the power laying unit.

According to the above-described configuration (11), various kinds of abnormalities which may occur in the middle of the forming process can be detected in an early stage and accurately by including the above-mentioned process abnormality detection system (including the above-mentioned respective kinds of aspects).

(12) In order to solve the above-mentioned problem, a process abnormality detection method for a three-dimensional additive manufacturing device according to at least one embodiment of the present invention is a method of detecting a process abnormality of a three-dimensional additive manufacturing device which performs additive modeling by emitting a beam to a powder bed, wherein the method includes: a shape measurement step of measuring a surface shape of the powder bed; and a laying abnormality determination step of determining that a laying abnormality of the powder bed is occurring if at least one of a first condition that an average height of the powder bed from a reference position is out of a first predetermined range or a second condition that a height variation of the powder bed is out of a second predetermined range is satisfied on the basis of a measurement result of the shape measurement step.

The above-described method (12) can be implemented preferably by the above-mentioned process abnormality detection system (including the above-mentioned respective kinds of aspects).

(13) In order to solve the above-mentioned problem, a process abnormality detection method for a three-dimensional additive manufacturing device according to at least one embodiment of the present invention is a method of detecting a process abnormality of a three-dimensional additive manufacturing device which performs additive modeling by emitting a beam to a powder bed, wherein the method includes: a shape measurement step of measuring a surface shape of the powder bed after emitting the beam; and a forming abnormality determination step of determining that a forming abnormality of a forming layer from the powder bed is occurring if a third condition that a deformation amount of the powder bed due to emission of the beam is out of a third predetermined range is satisfied, on the basis of a measurement result of the shape measurement step.

The above-described method (13) can be implemented preferably by the above-mentioned process abnormality detection system (including the above-mentioned respective kinds of aspects).

(14) In order to solve the above-mentioned problem, a method for manufacturing a three-dimensional additive manufactured product according to at least one embodiment of the present invention is a method for manufacturing a three-dimensional additive manufactured product by performing additive modeling by emitting a beam to powder laid in a layered state, wherein the method includes: a step of forming a powder bed by laying the powder on a base plate; a shape measurement step of measuring a surface shape of the powder bed; a laying abnormality determination step of determining that a laying abnormality of the powder bed is occurring if at least one of a first condition that an average height of the powder bed from a reference position is out of a first predetermined range or a second condition that a height variation of the powder bed is out of a second predetermined range is satisfied, on the basis of a measurement result of the shape measurement step; a repair step of performing repair work of the laying defect when it is determined that the laying abnormality of the powder bed is occurring; and a step of selectively hardening the powder bed by emitting the beam to the powder bed.

The above-described manufacturing method (14) makes it possible to manufacture the three-dimensional additive manufactured product which has fewer laying abnormalities and is of high quality.

(15) In order to solve the above-mentioned problem, a three-dimensional additive manufactured product according to at least one embodiment of the present invention is a three-dimensional additive manufactured product manufactured by performing additive modeling by emitting a beam to powder laid in a layered state, wherein the three-dimensional additive manufactured product is manufactured by: forming a powder bed by laying the powder on a base plate; measuring a surface shape of the powder bed; determining that a laying abnormality of the powder bed is occurring if at least one of a first condition that an average height of the powder bed from a reference position is out of a first predetermined range or a second condition that a height variation of the powder bed is out of a second predetermined range is satisfied, on the basis of a measurement result of the surface shape of the powder bed; performing repair work of the laying defect when it is determined that the laying abnormality of the powder bed is occurring; and selectively hardening the powder bed by emitting the beam to the powder bed.

The three-dimensional additive manufactured product described above in (15) has fewer laying defects and is of high quality.

Advantageous Effects

The process abnormality detection system for the three-dimensional additive manufacturing device capable of detecting various kinds of abnormalities, which may occur in the middle of the forming process, in an early stage and accurately, the three-dimensional additive manufacturing device equipped with the above-described system, and the process abnormality detection method for the three-dimensional additive manufacturing device can be provided according to at least one embodiment of the present invention.

DETAILED DESCRIPTION

Some embodiments of the present invention will now be described with reference to the accompanying drawings. It is intended, however, that dimensions, materials, shapes, relative positions and the like of components described in the embodiments or illustrated in the drawings shall be interpreted as illustrative only and not limitative of the scope of the present invention.

For example, expressions representing relative or absolute positioning such as "in a certain direction," "along a certain direction," "parallel," "perpendicular to," "center," "concentric," or "coaxial" not only strictly represent such arrangement, but also represent a state where its position is relatively changed within tolerance or by an angle or distance of some degree that allows to obtain the same function.

Furthermore, for example, expressions representing shapes such as a quadrangular shape and a cylindrical shape not only represent the shapes of, for example, the quadrangular shape and the cylindrical shape in a geometrically strict sense, but also represent shapes including protrusions, recesses, chamfered parts, etc. within a range capable of obtaining the same effects.

On the other hand, an expression such as "comprise", "include", "have", "contain" and "constitute" are not intended to be exclusive of other components.

Figure 1:
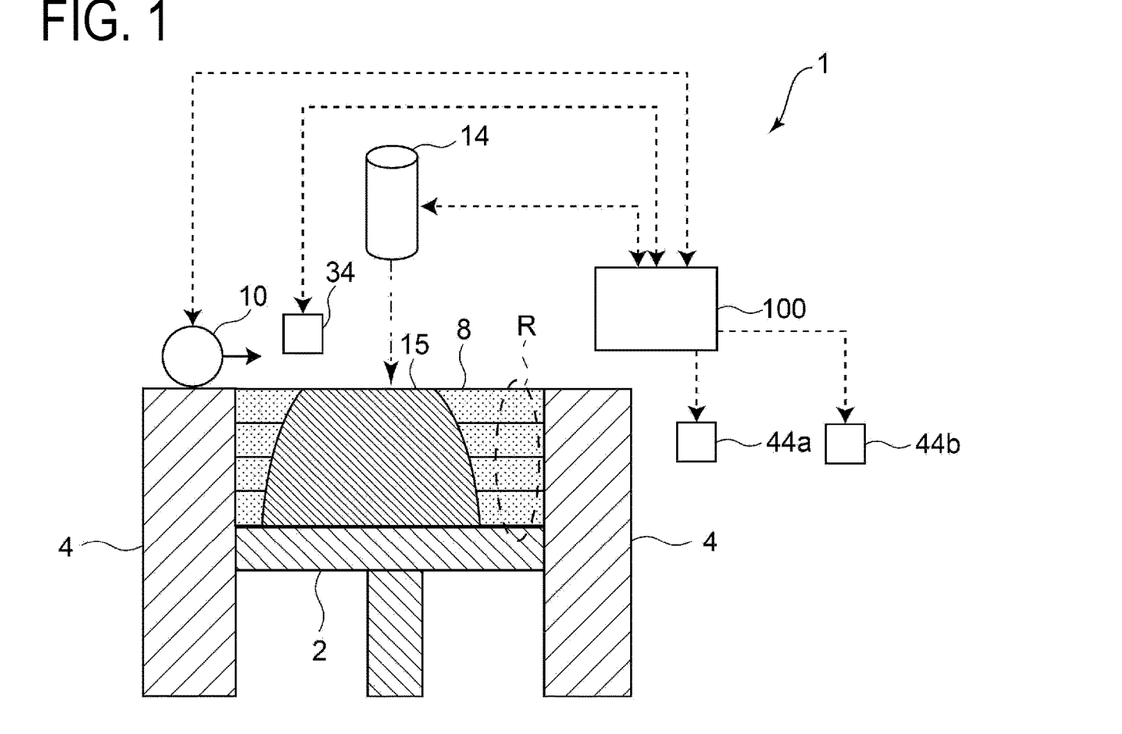
FIG. 1 is a schematic diagram illustrating an overall configuration of a three-dimensional additive manufacturing device according to at least one embodiment of the present invention.

FIG. 1 is a schematic diagram illustrating an overall configuration of a three-dimensional additive manufacturing device 1 according to at least one embodiment of the present invention.

The three-dimensional additive manufacturing device 1 is a device for manufacturing a 3D-shaped object by performing additive modeling by emitting a beam to powder laid in a layered state. The three-dimensional additive manufacturing device 1 includes a base plate 2 which serves as a base for forming the 3D-shaped object. The base plate 2 is located inside a cylinder 4 which has a central axis along a vertical direction and is of a substantially cylindrical shape so that the base plate 2 can move upwards and downwards. A powder bed 8 is formed on the base plate 2 by laying powder as described later. Every time the base plate 2 moves downwards in every cycle during the forming work, the powder bed 8 is newly formed by laying the powder on its upper layer side.

Incidentally, regarding the three-dimensional additive manufacturing device 1 in this embodiment, a case where a light beam as the beam is emitted is shown; however, the idea of the present invention can be similarly applied to even a case where beams in other forms such as an electron beam are used.

The three-dimensional additive manufacturing device 1 includes a powder laying unit 10 for forming the powder bed 8 by laying the powder on the base plate 2. The powder laying unit 10 forms the powder bed 8 in a layered state, which has a substantially uniform thickness over the entire upper surface of the base plate 2, by supplying the powder to the upper surface side of the base plate 2 and flattening that surface. A new powder bed is formed and thereby laminated in the layered state on the powder bed 8 formed in every cycle as the powder bed is selectively solidified by emission of a light beam from a light beam emitting unit 14 described later and then the powder is laid again on the upper layer side by the powder laying unit 10 in the next cycle.

Incidentally, the powder supplied from the powder laying unit 10 is a powdery substance which is a raw material of the 3D-shaped object; and, for example, a wide variety of metal materials such as iron, copper, aluminum, or titanium and non-metal materials such as ceramics can be adopted as the powder.

Figure 2:
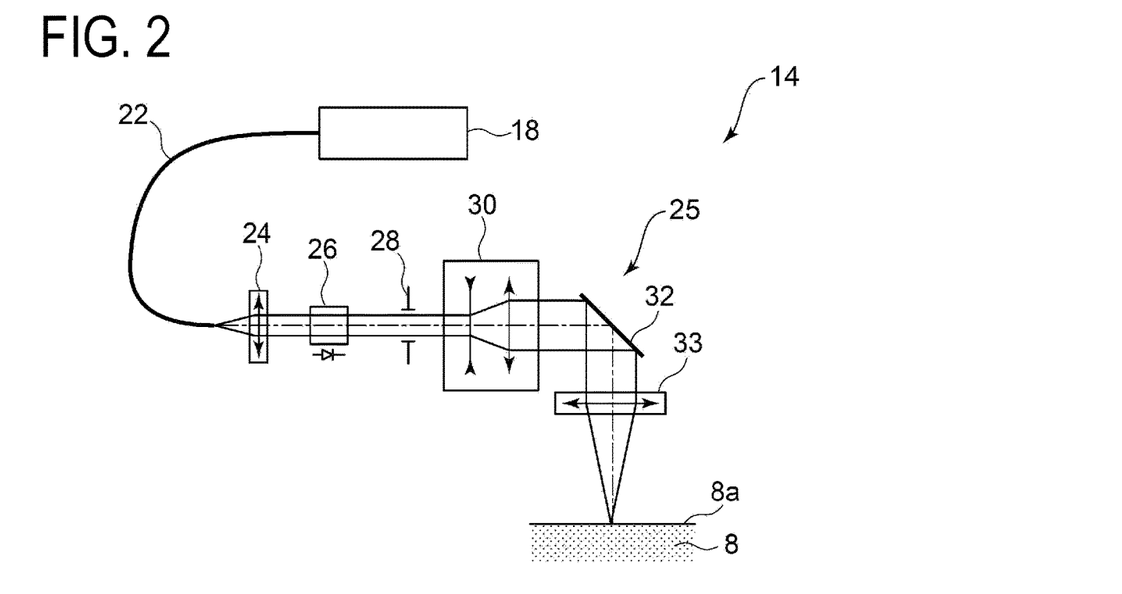
FIG. 2 is a schematic diagram illustrating an internal configuration of a light beam emitting unit in FIG. 1.

The three-dimensional additive manufacturing device 1 includes the light beam emitting unit 14 for emitting the light beam to the powder bed 8 so as to selectively harden the powder bed 8. Under this circumstance, FIG. 2 is a schematic diagram illustrating an internal configuration of the light beam emitting unit 14 in FIG. 1. The light beam emitting unit 14 includes: a light source 18 which outputs a laser beam as the light beam; an optical fiber 22 for guiding the light beam from the light source 18 to a light converging part 25; and the light converging part 25 composed of a plurality of optical members.

Regarding the light converging part 25, the light beam guided by the optical fiber 22 enters a collimator 24. The collimator 24 focuses the light beam into parallel light. The light emitted from the collimator 24 enters a beam expander 30 via an isolator 26 and a pinhole 28. After the diameter of the light beam is expanded by the beam expander 30, the expanded light beam is deflected by a galvanometer mirror 32, which is capable of swinging in an arbitrary direction, and is then emitted to the powder bed 8 via an fθ lens 33.

The light beam emitted from the light beam emitting unit 14 is scanned two-dimensionally along the surface 8*a* of the powder bed 8. Such two-dimensional scanning of the light beam is performed in a pattern according to the 3D-shaped object, which is the forming purpose, and may be implemented, for example, by a drive mechanism which is not illustrated in the drawing and causes the light beam emitting unit 14 to move along the surface of the base plate 2, or may be implemented by controlling the angle of the galvanometer mirror 32, or may be implemented by a combination of the drive mechanism and the control of the angle of the galvanometer mirror 32 as mentioned above.

With the three-dimensional additive manufacturing device 1 having such a configuration, the powder bed 8 is formed by having the powder laying unit 10 lay the powder on the base plate 2 in every cycle and the powder contained in the powder bed 8 is selectively solidified by performing the two-dimensional scanning while emitting the light beam from the light beam emitting unit 14 to the powder bed 8. Through the forming work, the solidified forming layers 15 are laminated by repeatedly performing such cycles, thereby manufacturing the intended 3D-shaped object.

Referring to FIG. 1 again, the three-dimensional additive manufacturing device 1 includes a shape measurement sensor 34 for monitoring a shape of the powder bed 8 or the forming layer 15 during the forming work. In this embodiment, an optical scanner based on the fringe projection method is used as an example of the shape measurement sensor 34.

Figure 3:
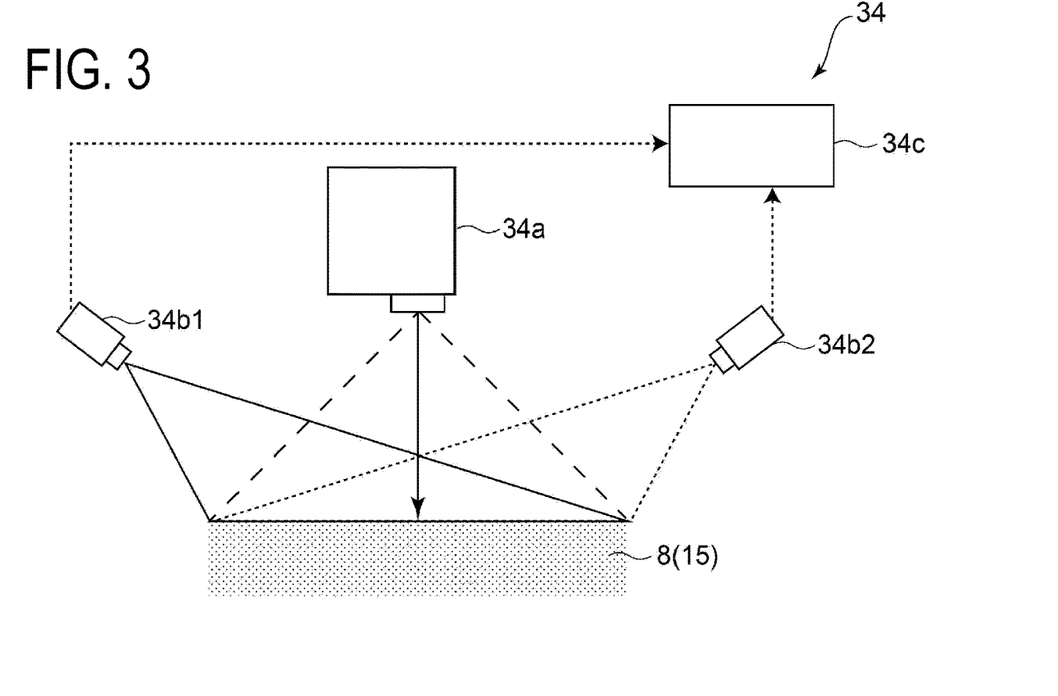
FIG. 3 is a schematic diagram illustrating a specific configuration example of a shape measurement sensor in FIG. 1.

Under this circumstance, FIG. 3 is a schematic diagram illustrating a specific configuration example of the shape measurement sensor 34 in FIG. 1. The shape measurement sensor 34 is configured by including: a projector 34*a* for projecting a fringe pattern (a stripe pattern) onto the surface of the powder bed 8 or the forming layer 15; at least one image-capturing unit 34*b*1 and 34*b*2 for capturing an image of the projected fringe pattern; and an analyzer part 34*c* for generating 3D data representing the surface shape of the powder bed 8 or the forming layer 15 on the basis of the image(s) of the fringe pattern captured by these image-capturing units 34*b*1 and 34*b*2. With the analyzer part 34*c*, the two-dimensional fringe pattern whose image(s) is captured by the image-capturing units 34*b*1 and 34*b*2 is transformed, on a pixel basis, to an independent three-dimensional coordinate system according to an optical transformation formula and the operation is thereby performed to create the 3D data.

Incidentally, regarding the fringe projection method performed by the shape measurement sensor 34, its known example will be applied and its detailed explanation is omitted. Furthermore, the analyzer part 34*c* is composed of, for example, an electronic arithmetic unit such as a computer, but may be included in a control device 100 described later.

Incidentally, this embodiment has described, as an example, the case where it is configured so that both the powder bed 8 and the forming layer 15 can be monitored by the common shape measurement sensor 34; however, it may be configured so that the powder bed 8 and the forming layer 15 can be monitored by shape measurement sensors with separate configurations, respectively.

The three-dimensional additive manufacturing device 1 also includes a laying-abnormality warning part 44*a* and a forming-abnormality warning part 44*b* for making the operator and the external equipment recognize the occurrence of abnormalities. In this embodiment, there are two types of abnormalities which occur in the three-dimensional additive manufacturing device 1: laying abnormalities and forming abnormalities. The laying-abnormality warning part 44*a* and the forming-abnormality warning part 44*b* are configured so that they report the laying abnormalities and the forming abnormalities, respectively, thereby making it possible to identify the two types of abnormalities.

Furthermore, when a target to recognize the warning by the laying-abnormality warning part 44*a* and the forming-abnormality warning part 44*b* is a human such as the operator, the laying-abnormality warning part 44*a* and the forming-abnormality warning part 44*b* are composed of, for example, buzzers or indicators for reporting the occurrence of an abnormality in a manner capable of recognizing it by five senses such as the visual sense or the auditory sense. Moreover, when the target to recognize the warning by the laying-abnormality warning part 44*a* and the forming-abnormality warning part 44*b* is the external equipment, the laying-abnormality warning part 44*a* and the forming-abnormality warning part 44*b* are configured so that they transmit an electric signal which can be recognized by the external equipment; and the external equipment may be configured so that a specified corresponding action can be performed automatically by receiving this electric signal.

The control device 100 is a control unit for the three-dimensional additive manufacturing device 1 and is composed of, for example, electronic arithmetic units such as computers. Typically, the control device 100 is configured by including input devices capable of inputting various kinds of information, storage devices capable of storing various kinds of information, arithmetic devices capable of operating various kinds of information, and output devices capable of outputting various kinds of information; however, a known example will be applied with respect to a general configuration of these electronic arithmetic units and its detailed explanation is omitted here. The above-described control device 100 is configured so that it implements the process abnormality detection system according to at least one embodiment of the present invention by operating in accordance with programs stored in the storage devices in advance.

Figure 4:
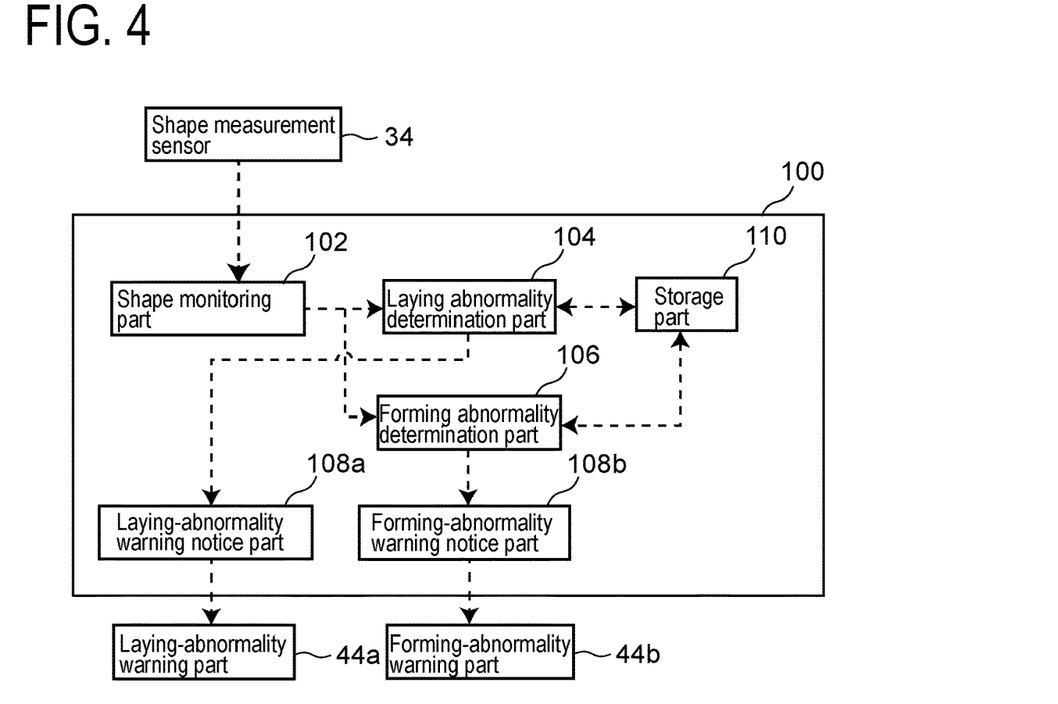
FIG. 4 is a block diagram functionally illustrating an internal configuration of a control device in FIG. 1.

FIG. 4 is a block diagram functionally illustrating an internal configuration of the control device 100 in FIG. 1. Incidentally, FIG. 4 representatively illustrates only the components relating to the control content described later, from among functional components of the control device 100, and the control device 100 may also include other components as necessary.

The control device 100 includes: a shape monitoring part 102 which obtains the detection results of the shape measurement sensor; a laying abnormality determination part 104 for determining laying abnormalities of the powder bed 8; a forming abnormality determination part 106 for determining forming abnormalities of the forming layer; a laying-abnormality warning notice part 108a and a forming-abnormality warning notice part 108b for operating the laying-abnormality warning part 44a and the forming-abnormality warning part 44b, respectively; and a storage part 110 capable of storing various kinds of information required to implement the process abnormality detection system.

The shape monitoring part 102 obtains the detection results from the shape measurement sensor 34 and gives the obtained detection results to the laying abnormality determination part 104, the shaping abnormality determination part 106, or the storage part 110, respectively, as necessary. Particularly, data relating to the surface shape of the powder bed 8 before the emission of the light laser, from among the detection results of the shape measurement sensor 34, are sent to the laying abnormality determination part 104. Furthermore, data relating to the surface shape of the forming layer 15 after the emission of the light laser, from among the detection results of the shape measurement sensor 34, are sent to the forming abnormality determination part 106.

The laying abnormality determination part 104 determines laying abnormalities in the powder bed 8 before the emission of the light beam by the light beam emitting unit on the basis of the measurement result obtained by the shape monitoring part 102. Such laying abnormality determination is performed based on whether any one of the first condition and the second condition which are stored in the storage part 110 in advance is satisfied or not.

Figure 5:
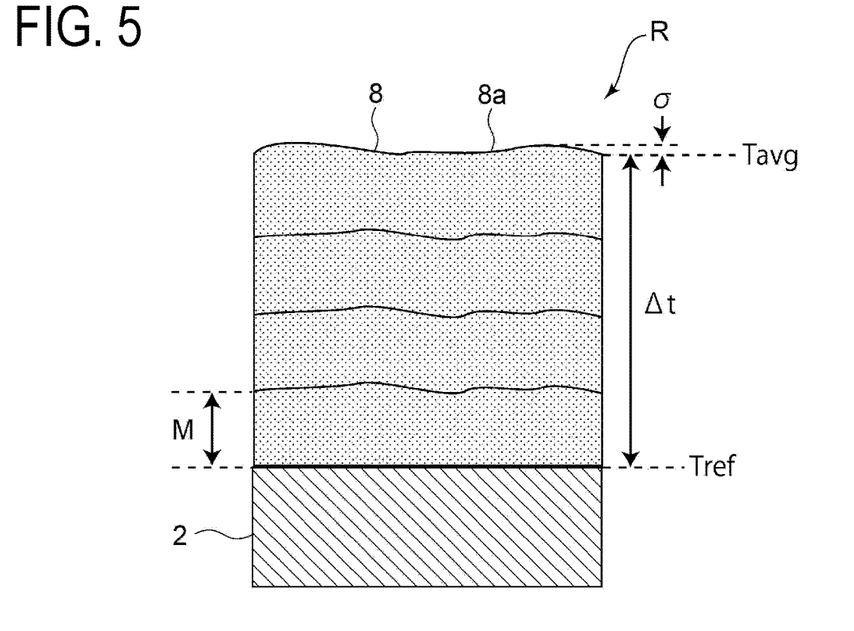
FIG. 5 is an enlarged sectional view of a broken line area R in FIG. 1.

Now, the definition content of the first condition and the second condition will be explained specifically with reference to FIG. 5. FIG. 5 is an enlarged sectional view of a broken line area R in FIG. 1. FIG. 5 illustrates a cross-section of the powder bed 8 in which a plurality of layers are laid on the base plate 2 by the powder laying unit 10. Each layer of the powder bed 8 is formed with the thickness M by being repeatedly laid on the base plate 2 when the base plate 2 moves downwards by a movement amount M in every forming cycle.

Regarding the above-described laminated cross-section, the surface of the base plate 2 is set as a reference position Tref. This reference position Tref may be set based on a surface position of an N-th layer (N: an arbitrary natural number) of the powder bed 8. The thus-defined reference position Tref may be stored in the storage part 110 in advance and read as the need arises.

Under this circumstance, an ideal surface 8a of the powder bed 8 would be flat by laying the powder uniformly before the emission of the light beam; however, as illustrated in FIG. 5, not a few microscopic protrusions and recesses actually exist and there is a possibility that such protrusions and recesses, depending on their sizes, may lead to the inferior quality of a formed object. The first condition is judged based on whether the difference $\Delta t$ between an average height Tavg of the powder bed 8 from the reference position Tref and the reference position Tref is out of a first predetermined range or not. The first predetermined range defines a proper range of the difference $\Delta t$ by a lower limit value Tavg_min and an upper limit value Tavg_max. The lower limit value Tavg_min is a threshold value for determining a laying abnormality when the average height Tavg of the laid powder bed 8 is too low (for example, when the powder bed 8 has a locally thin area due to a recess), a light beam output becomes excessive relative to the powder amount of the powder bed 8, which results in excessive melting. On the other hand, the upper limit value Tavg_max is a threshold value for determining a laying abnormality when the average height Tavg of the laid powder bed 8 is too high (for example, when the powder bed 8 has a locally thick area due to a protrusion), the beam output becomes insufficient relative to the powder amount of the powder bed 8, which results in the shortage of melting.

The above-described first condition is defined by, for example, the expression $0.5M < \Delta t < 2M$ by using the movement amount M of the base plate 2 per forming cycle (that is, the thickness of one layer of the powder bed 8).

The second condition is judged based on whether or not the height variation a of the powder bed 8 is out of the second predetermined range. Under this circumstance, the variation $\sigma$ is defined as a deviation between the difference $\Delta t$ from the reference height Tref and the average height Tavg at each position on the surface 8a as illustrated in FIG. 5. The second predetermined range defines a proper range of the variation a by an upper limit value σref. The upper limit value σref is set as a threshold value for determining whether or not the variation of the relevant protrusion or recess over the surface 8a of the powder bed 8 is large enough to cause defective forming.

The above-described second condition is defined by, for example, the expression $3\sigma < M$ by using the movement amount M of the base plate 2 per forming cycle (that is, the thickness of one layer of the powder bed 8).

Subsequently, the forming abnormality determination part 106 determines the forming abnormality in the forming layer 15 formed by the emission of the light beam by the light beam emitting unit 14 on the basis of the measurement result obtained by the shape monitoring part 102. Such forming abnormality determination is performed by checking whether the third condition stored in the storage part 110 in advance is satisfied or not.

Figure 6:
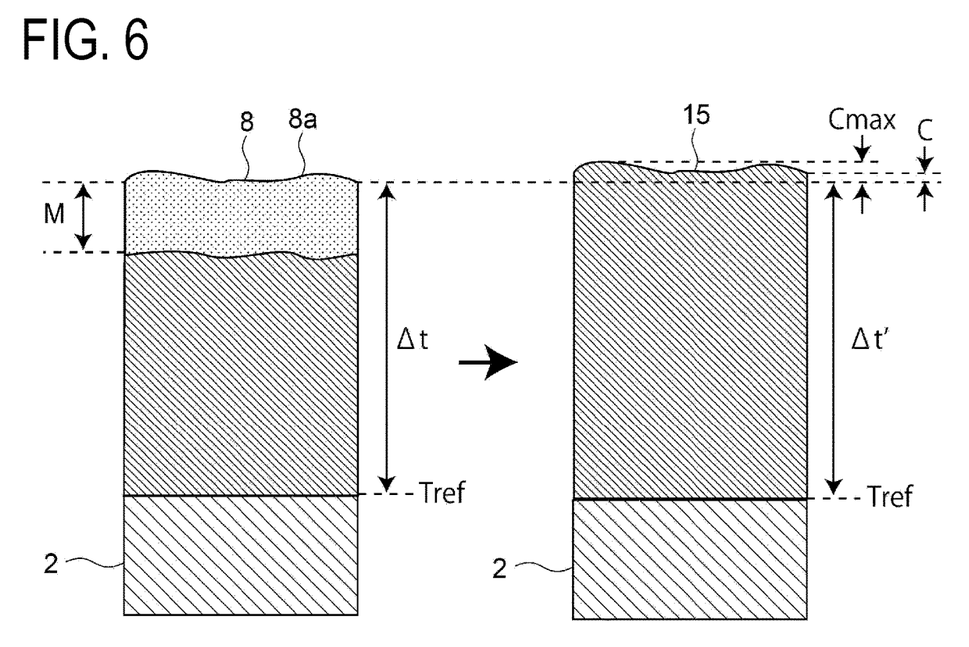
FIG. 6 is an enlarged sectional view of the broken line area R in FIG. 1 before and after the emission of the light beam.

Now, the definition content of the third condition will be specifically explained with reference to FIG. 6. FIG. 6 is an enlarged sectional view of the broken line area R in FIG. 1 before and after the emission of the light beam. As indicated on the left side, FIG. 6 illustrates a case where a forming layer 15 with a thickness $\Delta t'$ is formed by emitting the light beam to the powder bed 8 with a thickness $\Delta t$. In this case, a deformation amount C of the powder bed 8 by the emission of the light beam is obtained as the difference between the thickness $\Delta t$ before the emission and the thickness $\Delta t'$ after the emission. The shaping abnormality determination part 106 obtains such deformation amount C over the entire surface of the forming layer 15 and determines the forming abnormality based on whether its maximum value (maximum deformation amount) Cmax is within the third predetermined range or not.

The above-described third condition is defined by, for example, the expression $Cmax < M$ by using the maximum deformation amount Cmax of the powder bed 8 and the movement amount M of the base plate per forming cycle.

When it is determined by the laying abnormality determination part 104 that a laying abnormality exists, the laying-abnormality warning notice part 108a issues a warning to that effect by operating the laying-abnormality warning part 44a. When it is determined by the forming abnormality determination part 106 that a shaping abnormality exists, the forming-abnormality warning notice part 108b issues a warning to that effect by operating the forming-abnormality warning part 44b.

The storage part 110 is composed of a storage medium such as a memory and stores various kinds of information such as the definition content of the above-mentioned first to third conditions.

Figure 7:
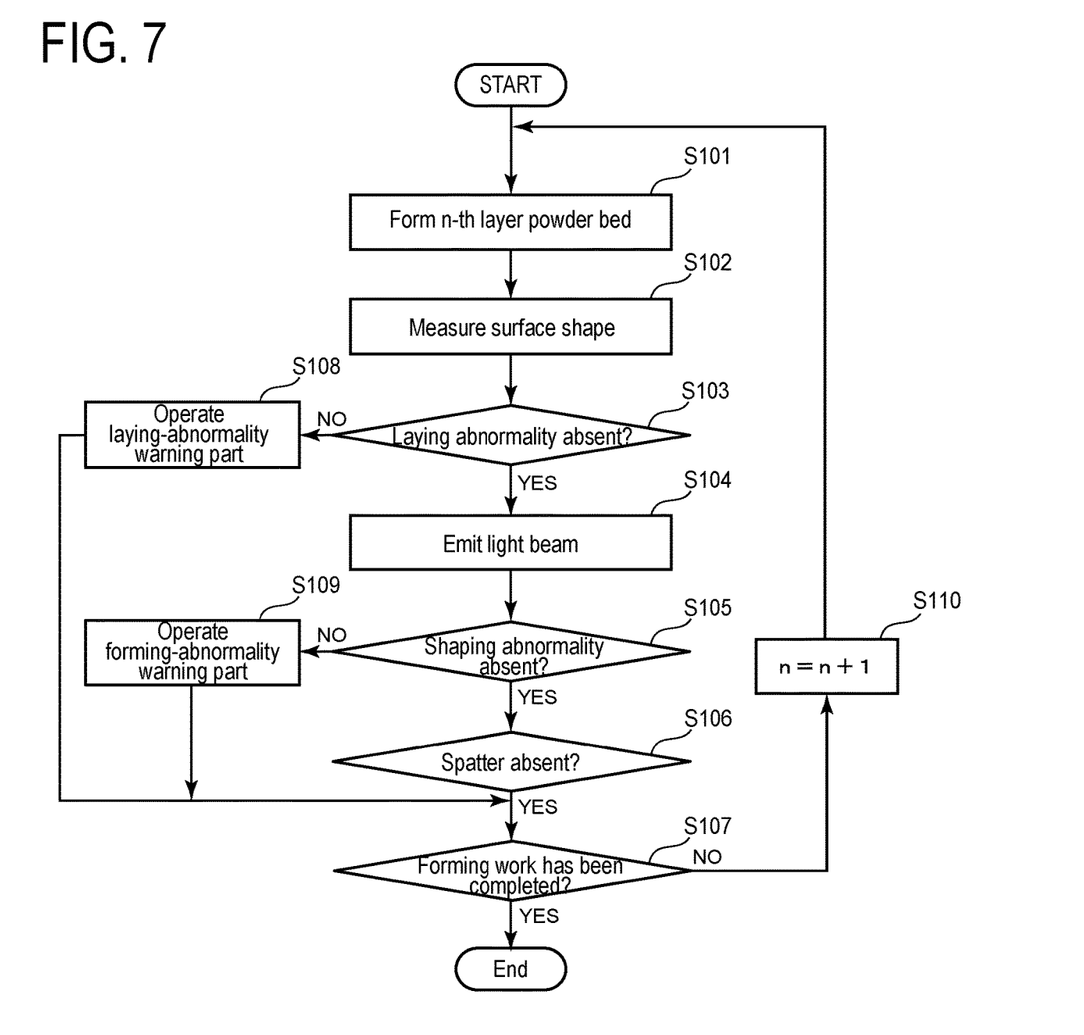
FIG. 7 is a flowchart illustrating each step of control content of the three-dimensional additive manufacturing device in FIG. 1.

Subsequently, the control content of the three-dimensional additive manufacturing device 1 having the above-described configuration will be explained in detail. FIG. 7 is a flowchart illustrating each step of the control content of the three-dimensional additive manufacturing device 1 in FIG. 1. Incidentally, the three-dimensional additive manufacturing device 1 proceeds with the steps by repeating forming cycles for configuring a 3D-shaped object which is the purpose of forming; and in the following explanation, an n-th (n: an arbitrary natural number) forming cycle will be explained as an example.

Firstly, the three-dimensional additive manufacturing device 1 controls the powder laying unit 10 to lay the powder on the base plate 2 or on an (n-1)th layer of the powder bed 8 which has already been laid over the base plate, thereby forming the n-th layer of the powder bed 8 (step S101). The layer thickness M of this newly formed powder bed 8 is, for example, several tens of μm.

Then, the shape monitoring part 102 measures the surface shape of the powder bed 8 by obtaining the measurement result from the shape measurement sensor 34 (step S102). Under this circumstance, the shape measurement sensor 34 measures the surface shape of the powder bed 8 as a three-dimensional structure by the measurement based on the fringe projection method as mentioned earlier with reference FIG. 3.

Subsequently, the laying abnormality determination part 104 determines the presence or absence of the laying abnormality in the powder bed 8 laid in step S101, on the basis of the measurement result obtained from the shape monitoring part 102 (step S103). According to this laying abnormality determination, when at least one of the first condition and the second condition described above is satisfied, it is determined that a laying abnormality of the powder bed 8 is occurring. Under the first condition, the laying abnormality is determined based on whether the average height Tavg of the powder bed 8 from the reference position Tref is out of the first predetermined range or not. Accordingly, the laying abnormality can be determined, for example: when the average height Tavg of the laid powder bed is too low, the light beam output becomes excessive relative to the powder amount of the powder bed, which results in excessive melting; and on the other hand, when the average height Tavg of the laid powder bed 8 is too high, the light beam output becomes insufficient relative to the powder amount of the powder bed, which results in the shortage of melting. Furthermore, under the second condition, the laying abnormality can be determined based on whether or not the height variation a of the powder bed is out of the second predetermined range. Consequently, any abnormality which may occur in the middle of the forming process and lead to the inferior quality can be detected in an early stage and accurately by determining the laying abnormality from the two viewpoints, that is, the first condition and the second condition.

When it is determined that the laying abnormality is present (step S103: NO), the laying-abnormality warning notice part 108a reports the occurrence of the laying abnormality by operating the laying-abnormality warning part 44a (step S108).

Consequently, the operator and the peripheral equipment that have recognized the warning can deal with the situation appropriately by, for example, discontinuing or suspending the forming work. For example, when it is determined that the laying abnormality exists, the forming work is discontinued and also repair work is implemented by, for example, repairing the powder laid condition and/or laying the powder bed again at the position(s) where it is determined that the laying abnormality exists. When such repair work is completed, the discontinued state of the forming work is canceled and the additive molding is continued.

On the other hand, when the laying abnormality is absent (step S103: YES), the control device 100 executes the forming processing by emitting the light beam to the powder bed 8 laid in step S101 by controlling the light beam emitting unit 14 (step S104).

Then, when the emission of the light beam is completed, the forming abnormality determination part 106 determines the presence or absence of shaping abnormality in the forming layer 15 after the emission or not, based on the measurement result obtained from the shape monitoring part 102 (step S105). According to this shaping abnormality determination, when the deformation amount of the powder bed 8 is out of the third predetermined range defined by the above-mentioned third condition, it is determined that the shaping abnormality is occurring. Consequently, when a significant deformation more than expected has occurred as a result of melting of the powder of the powder bed 8 by the emission of the light beam, it can be determined as the forming abnormality.

When it is determined that the forming abnormality is present (step S105: NO), the forming-abnormality warning notice part 108b reports the occurrence of the laying abnormality by operating the forming-abnormality warning part 44b (step S109).

Consequently, the operator and the peripheral equipment that have recognized the warning can deal with the situation appropriately by, for example, discontinuing or suspending the forming work.

On the other hand, when it is determined that the forming abnormality is absent (step S105: YES), the forming abnormality determination part 106 further determines the presence or absence of the spatter on the forming layer 15 locally, based on the measurement result obtained from the shape monitoring part 102 (step S6). Such spatter determination may be performed based on, for example, whether or not a projected area (protrusion projected area) of a protruding deformation amount produced on the surface of the powder bed after the beam emission is equal to or less than an assumed spatter particle diameter. Under this circumstance, the spatter particle diameter which serves as the reference can be set corresponding to a spatter occurrence form; and, for example, in a case of spatters in the occurrence form where the spatters scatter from a molten pool formed by the emission of the beam to the powder bed and then solidify, the assumed spatter particle diameter is relatively large, that is, approximately 150 μm to 300 μm, so that it can be determined that the spatter(s) exists locally when the protrusion projected area of 300 µm×300 µm or smaller is obtained.

When any spatter is present (step S6: NO), the forming-abnormality warning notice part 108b reports the occurrence of the forming abnormality by operating the forming-abnormality warning part 44b (step S109). When the spatter(s) exists locally on the forming layer 15 after the emission of the light beam as described above, it is determined, regardless of whether the third condition is satisfied or not, that the forming abnormality is occurring. This is because the spatter (s) with the particle diameter larger than that of normal powder may cause incomplete fusion, which results in strength degradation, and because the spatter(s) is formed by containing oxides at a relatively high rate when the powder is melted by the beam, so that if the spatter(s) exists locally, it may easily cause subsequent defective forming.

On the other hand, when the spatter is absent (step S6: YES), the control device 100 determines whether or not the sequence of forming work has been completed by repeating the forming cycles sufficiently (step S107). If the forming processing has not been completed (step S107: NO), the control device 100 returns the processing to step S101 and proceeds to the processing for forming the (n+1)th layer (step S110).

Subsequently, when the forming cycle has been repeated sufficiently and the forming work is completed (step S107: YES), a nondestructive test is performed on the completed 3D-shaped object as necessary and the sequence of forming work terminates (END).

According to at least one embodiment as described above, the process abnormality detection system for the three-dimensional additive manufacturing device capable of detecting various kinds of abnormalities, which may occur in the middle of the forming process, in an early stage and accurately, the three-dimensional additive manufacturing device, and the process abnormality detection method for the three-dimensional additive manufacturing device can be provided.

INDUSTRIAL APPLICABILITY

At least one embodiment of the present invention can be used for the process abnormality detection system for the three-dimensional additive manufacturing device which performs additive modeling by emitting the light beam to the laid powder and selectively hardening it, the three-dimensional additive manufacturing device, and the process abnormality detection method for the three-dimensional additive manufacturing device.

REFERENCE SIGNS LIST

1 Three-dimensional additive manufacturing device
2 Base plate
4 Cylinder
8 Powder bed
8a Surface
10 Powder laying unit
14 Light beam emitting unit
15 Forming layer
18 Light source
22 Optical fiber
24 Collimator
25 Light converging part
26 Isolator
28 Pinhole
30 Beam expander
32 Galvanometer mirror
33 Lens
34 Shape measurement sensor
34a Projector
34b1 Image-capturing unit
34c Analyzer part
44a Laying-abnormality warning part
44b Forming-abnormality warning part
100 Control device
102 Shape monitoring part
104 Laying abnormality determination part
106 Forming abnormality determination part
108a Laying-abnormality warning notice part
108b Forming-abnormality warning notice part
110 Storage part

The invention claimed is:

1. A process abnormality detection system for a three-dimensional additive manufacturing device which performs additive modeling by emitting a beam to a powder bed, the powder bed having a plurality of layers laid on a base plate by a powder laying unit, each layer of the powder bed being repeatedly laid on the base plate when the base plate moves downwards by a movement amount M in every forming cycle such that each layer has a thickness corresponding to M, the process abnormality detection system comprising:
   a shape measurement sensor for measuring a surface shape of the powder bed;
   a laying abnormality determination part configured to determine that a laying abnormality of the powder bed is occurring if at least one of a first condition that an average height of the powder bed from a reference position is out of a first predetermined range or a second condition that a height variation of the powder bed is out of a second predetermined range is satisfied, on the basis of a measurement result of the shape measurement sensor; and
   a laying-abnormality warning notice part configured to issue a warning for notifying the laying abnormality if the laying abnormality determination part determines that the laying abnormality is occurring,
   wherein the shape measurement sensor includes:
      a projector for projecting a fringe pattern on a surface of the powder bed;
      at least one image-capturing unit for capturing an image of the fringe pattern; and
      an analyzing part for generating a 3D data representing the surface shape of the powder bed on the basis of the image of the fringe pattern captured by the image-capturing unit,
   and wherein the first predetermined range is determined by an expression $0.5M < \Delta t < 2M$, where $\Delta t$ is a difference between the reference position and the average height of the powder bed from the reference position.

2. The process abnormality detection system for a three-dimensional additive manufacturing device according to claim 1, further comprising
   a forming abnormality determination part configured to determine that a forming abnormality of a forming layer from the powder bed is occurring if a third condition that a deformation amount of the powder bed due to emission of the beam is out of a third predetermined range is satisfied, on the basis of a measurement result of the powder bed by the shape measurement sensor after emission of the beam.

3. The process abnormality detection system for a three-dimensional additive manufacturing device according to claim 2,
wherein the forming abnormality determination part is configured to determine that the forming abnormality of the forming layer from the powder bed is occurring if a spatter exists locally on the forming layer on the basis of a measurement result of the powder bed by the shape measurement sensor after emission of the beam, whether or not the third condition is satisfied.

4. The process abnormality detection system for a three-dimensional additive manufacturing device according to claim 2, further comprising
a forming-abnormality warning notice part configured to issue a warning for notifying the forming abnormality if the forming abnormality determination part determines that the forming abnormality is occurring.

5. The process abnormality detection system for a three-dimensional additive manufacturing device according to claim 1,
wherein the second predetermined range is determined by an expression $3\sigma<M$, where $\sigma$ is the height variation of the powder bed.

6. The process abnormality detection system for a three-dimensional additive manufacturing device according to claim 2,
wherein the third predetermined range is determined by an expression $Cmax<M$, where $Cmax$ is a maximum deformation amount of the powder bed.

7. A process abnormality detection system for a three-dimensional additive manufacturing device which performs additive modeling by emitting a beam to a powder bed, the powder bed having a plurality of layers laid on a base plate by a powder laying unit, each layer of the powder bed being repeatedly laid on the base plate when the base plate moves downwards by a movement amount M in every forming cycle such that each layer has a thickness corresponding to M, the process abnormality detection system comprising:
a shape measurement sensor for measuring a surface shape of the powder bed;
a forming abnormality determination part configured to determine that a forming abnormality of a forming layer from the powder bed is occurring if a first condition that a deformation amount of the powder bed due to emission of the beam is out of a first predetermined range is satisfied, on the basis of the measurement result of the powder bed by the shape measurement sensor before and after emission of the beam; and
a forming-abnormality warning notice part configured to issue a warning for notifying the forming abnormality if the forming abnormality determination part determines that the forming abnormality is occurring,
wherein the shape measurement sensor includes:
a projector for projecting a fringe pattern on a surface of the powder bed;
at least one image-capturing unit for capturing an image of the fringe pattern; and
an analyzing part for generating a 3D data representing the surface shape of the powder bed on the basis of the image of the fringe pattern captured by the image-capturing unit,
and wherein the first predetermined range is determined by an expression $Cmax<M$, where $Cmax$ is a maximum deformation amount of the powder bed.

8. A three-dimensional additive manufacturing device, comprising:
a base plate;
a powder laying unit for laying a powder on the base plate to form a powder bed;
a beam emitting unit for emitting a beam to the powder bed to selectively harden the powder bed; and
the process abnormality detection system according to claim 1 configured to detect at least a laying abnormality of the powder bed by the powder laying unit.

9. A method of detecting a process abnormality of a three-dimensional additive manufacturing device which performs additive modeling by emitting a beam to a powder bed, the powder bed having a plurality of layers laid on a base plate by a powder laying unit, each layer of the powder bed being repeatedly laid on the base plate when the base plate moves downwards by a movement amount M in every forming cycle such that each layer has a thickness corresponding to M, the method comprising:
measuring a surface shape of the powder bed, wherein the measuring of the surface shape includes
projecting a fringe pattern on a surface of the powder bed,
capturing an image of the fringe pattern, and
generating a 3D data representing the surface shape of the powder bed on the basis of the captured image of the fringe pattern;
determining that a laying abnormality of the powder bed is occurring if at least one of a first condition that an average height of the powder bed from a reference position is out of a first predetermined range or a second condition that a height variation of the powder bed is out of a second predetermined range is satisfied on the basis of a measurement result of the measuring of the surface shape; and
issuing a warning for notifying the laying abnormality upon determining that the laying abnormality is occurring,
wherein the first predetermined range is determined by an expression $0.5M<\Delta t<2M$, where $\Delta t$ is a difference between the reference position and the average height of the powder bed from the reference position.

10. A method for manufacturing a three-dimensional additive manufactured product by performing additive modeling by emitting a beam to powder laid in a layered state, the method comprising:
forming a powder bed by laying the powder on a base plate, the powder bed having a plurality of layers, each layer of the powder bed being repeatedly laid on the base plate when the base plate moves downwards by a movement amount M in every forming cycle such that each layer has a thickness corresponding to M;
measuring a surface shape of the powder bed, wherein the measuring of the surface shape includes
projecting a fringe pattern on a surface of the powder bed,
capturing an image of the fringe pattern, and
generating a 3D data representing the surface shape of the powder bed on the basis of the captured image of the fringe pattern;
determining that a laying abnormality of the powder bed is occurring if at least one of a first condition that an average height of the powder bed from a reference position is out of a first predetermined range or a second condition that a height variation of the powder bed is out of a second predetermined range is satisfied, on the basis of a measurement result of the measuring of the surface shape;

issuing a warning for notifying the laying abnormality upon determining that the laying abnormality is occurring;
performing repair work of the laying abnormality when it is determined that the laying abnormality of the powder bed is occurring; and
selectively hardening the powder bed by emitting the beam to the powder bed,
wherein the first predetermined range is determined by an expression $0.5M < \Delta t < 2M$, where $\Delta t$ is a difference between the reference position and the average height of the powder bed from the reference position.

\* \* \* \* \*